United States Patent
Sharma et al.

(10) Patent No.: US 11,436,601 B2
(45) Date of Patent: Sep. 6, 2022

(54) PRE-BUILT USER INTERFACE FOR PAYMENT SYSTEM AND METHOD

(71) Applicant: JPMORGAN CHASE BANK, N.A., New York, NY (US)

(72) Inventors: Sankate Sharma, Sunnyvale, CA (US); Facundo Ramos, San Franciso, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 440 days.

(21) Appl. No.: 16/574,144

(22) Filed: Sep. 18, 2019

(65) Prior Publication Data
US 2020/0097956 A1 Mar. 26, 2020

Related U.S. Application Data

(60) Provisional application No. 62/734,332, filed on Sep. 21, 2018.

(51) Int. Cl.
*G06Q 20/38* (2012.01)
*G06Q 20/36* (2012.01)
(Continued)

(52) U.S. Cl.
CPC .......... *G06Q 20/385* (2013.01); *G06F 40/14* (2020.01); *G06Q 20/085* (2013.01); *G06Q 20/3672* (2013.01)

(58) Field of Classification Search
None
See application file for complete search history.

(56) References Cited

U.S. PATENT DOCUMENTS 9,824,354 B1 11/2017 Collison et al.
10,134,036 B1 11/2018 Collison et al.
(Continued)

FOREIGN PATENT DOCUMENTS

WO 2013/188376 A1 12/2013

OTHER PUBLICATIONS

Sarah Perez, Watch Out PayPal: Competitor WePay Drops Prices, Rolls Out White Label Payments API, Techcrunch.com (Aug. 14, 2012), https://techcrunch.com/2012/08/14/paypal-competitor-wepay-adds-white-label-api-drops-prices/.
(Continued)

*Primary Examiner* — Neha Patel
*Assistant Examiner* — Nicholas K Phan
(74) *Attorney, Agent, or Firm* — Greenblum & Bernstein, P.L.C.

(57) ABSTRACT

The invention relates to a computer implemented system and method for payment flow integration using a pre-built user interface. The method comprises receiving, at a payment service provider, an API call from a partner server that specifies customized cascading style sheets (CSS) data for the partner. The customized CSS data allows the partner to customize the look and feel of a payment window that is embedded in the partner's webpage. The payment service provider server embeds the custom CSS data into an iFrame and transmits the iFrame URL to the partner server. The partner server embeds the iFrame in the partner's webpage. The method may also comprise receiving the user's payment information at the service provider's server, securely storing that information, and returning a payment token to the partner for enhanced security of the payment transaction.

16 Claims, 4 Drawing Sheets

(51) Int. Cl.
*G06Q 20/08* (2012.01)
*G06F 40/14* (2020.01)

(56) References Cited

U.S. PATENT DOCUMENTS

| | | |
|---|---|---|
| 2013/0046855 A1 | 2/2013 | Jiang et al. |
| 2013/0167162 A1 | 6/2013 | Fernandez |
| 2013/0187926 A1 | 7/2013 | Silverstein et al. |
| 2014/0026115 A1* | 1/2014 | Bank .................. G06F 8/38 717/113 |
| 2014/0229821 A1 | 8/2014 | Abrahami |
| 2016/0342997 A1 | 11/2016 | De Tella et al. |
| 2017/0270081 A1* | 9/2017 | Chitale ................. G06F 16/986 |
| 2017/0272415 A1* | 9/2017 | Zhao ................... H04L 63/0807 |
| 2018/0032980 A1* | 2/2018 | Rodriguez ........... G06Q 20/102 |
| 2018/0225265 A1 | 8/2018 | Fitzpatrick |
| 2019/0108511 A1* | 4/2019 | Dunjic ............... G06Q 20/3674 |
| 2019/0230070 A1* | 7/2019 | Isaacson ............. H04W 12/084 |

OTHER PUBLICATIONS

Wefarm-Java, Github.com, https://github.com/adamsommer/WeFarm-Java.

International Search Report and Written Opinion issued in corresponding International Application No. PCT/US2019/051617, dated Dec. 4, 2019 (7 pp).

Examination report dated Mar. 25, 2022 issued in United Kingdom patent application No. 2104776.6.

* cited by examiner

PRE-BUILT USER INTERFACE FOR PAYMENT SYSTEM AND METHOD

RELATED APPLICATIONS

This application claims priority to U.S. Provisional Application No. 62/734,332, filed Sep. 21, 2018, entitled "Pre-Built User Interface for Payment System and Method," which is hereby incorporated by reference.

FIELD OF INVENTION

The present invention relates generally to an electronic payment system, and more particularly to a computer implemented system and method for providing a pre-built user interface for a payment flow integration system.

BACKGROUND

Online payment systems continue to evolve as business models change and new online businesses are launched. Companies and other organizations also endeavor to continually improve their users' experience through better interfaces such as payment interfaces. One approach some organizations may follow is to utilize third party online payment service providers who provide online payment services to handle transactions requested by their users. For example, some organizations that operate online platforms redirect their users during checkout to a website or pop-up window of the third party online payment service provider. The user may be redirected to a pop-up window, or to a website of a third party payment service provider, for example, in order to execute a transaction on the platform. Payment service providers thereafter can authorize and verify the user's payment information using various existing payment networks and databases. Such an arrangement is useful for online platforms that cannot afford or do not want to be burdened with developing their own payment processing systems.

One significant drawback of such an approach is that the organization operating the online platform has little control over the look and feel of the user-facing payment user interface (UI) page that their users encounter. Usually, the payment service provider's payment page that the users are directed to is generic and standardized and does not appear graphically integrated with the online platform.

Online platforms alternatively may develop and host their own UI to capture user payment information and to process users' transactions. Such an approach, while giving an online platform more flexibility to customize their payment UI to match the look and feel of their website, burdens the online platform with the associated obligation to provide secure systems and policies to ensure safe handling of users' payment information. If an online platform stores users' sensitive payment information (e.g. credit card numbers and bank account numbers) on its servers, the online platform must comply with various standards, including for example, the Payment Card Industry (PCI) standards.

Accordingly, it would be desirable to have a payment flow integration system and method that provided increased flexibility, customizability, security and efficiency for facilitating user transactions on a platform's websites and apps.

SUMMARY

Exemplary embodiments of the invention described herein can provide enhanced security and customization of the user interface (UI) presented on the payment webpage or software application ("app") in an online platform. The embodiments described herein can enable partners operating online platforms, websites and apps to design and own the complete look and feel of their payment interface, as well as the user payment process and experience. In addition, embodiments of the invention can provide simplicity for developers developing payment pages and apps for online platforms, and can increase the speed, efficiency, and security of a payment system for an online platform's website or app. Exemplary embodiments of the invention may be used to provide these and other advantages for various online platforms, such as crowdsourcing platforms, fundraising platforms, websites for amateur sports teams, event planning platforms, and other similar online platforms, websites, and apps.

These advantages and others can be provided by a computer implemented system and method having a pre-built user interface for payment flow integration. The method may comprise the steps of: receiving a call from a partner's server to a payment service provider application residing on the payment service provider's server, wherein a custom CSS (cascading style sheets) URL (universal resource locator) is specified in the call; embedding, by the payment service provider's application, the custom CSS into an iFrame; transmitting, by the payment service provider's application, the iFrame URL and a onetime use token; embedding, at the partner's server, the iFrame and the onetime use token into the partner's UI of the partner's payment webpage accessible by a client device; receiving from the client device payment information via a payment form embedded in the iFrame of the UI of the payment webpage; transmitting, via a payment service provider's application, the payment information received from the client device and the onetime use token, directly to the payment service provider's server by use of the embedded iFrame; returning; via the payment service provider's application, a payment token to the partner's server; and processing the transaction, at the partner's server, via a server-to-server application programming interface (API) call using the payment token to the payment service provider's application.

According to another embodiment, the invention relates to a computer implemented system and method for executing an online payment transaction. The method may comprise the steps of: receiving, at a payment service provider (PSP) server, an application programming interface (API) call from a partner server, wherein the API call specifies customized CSS data for the partner; embedding, by the PSP server, the customized CSS data into an inline frame (iFrame); transmitting, by the PSP server to the partner server, an iFrame URL and a onetime use token, wherein the iFrame URL is designed to be embedded by the partner into a partner webpage, and the customized CSS data is used to customize a look and feel of a payment window within the partner webpage; receiving, at the PSP server, payment information of a user and the onetime use token, wherein the user payment information is transmitted directly to the PSP server via an iFrame.js program and the user payment information is not stored on the partner server; validating, at the PSP server, the onetime use token; generating, at the PSP server, a payment token associated with the user payment information; transmitting, by the PSP server, the payment token to the partner; receiving, at the PSP server from the partner server, an API call for a payment transaction that includes the payment token; and at the PSP server, using the payment token to execute the payment transaction by the user to the partner via a payment card network.

According to other embodiments the invention relates to a computer implemented system and a computer readable medium for executing an online payment transaction according to the process steps described herein.

Additional embodiments of the invention include a computer implemented method wherein the payment service provider stores the custom CSS URL as a CSS identification code (CSS ID); and wherein calls by the partner's server to the payment service provider's server specifying the CSS ID returns an iFrame generated from the CSS URL to the partner's server.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Figure 1:
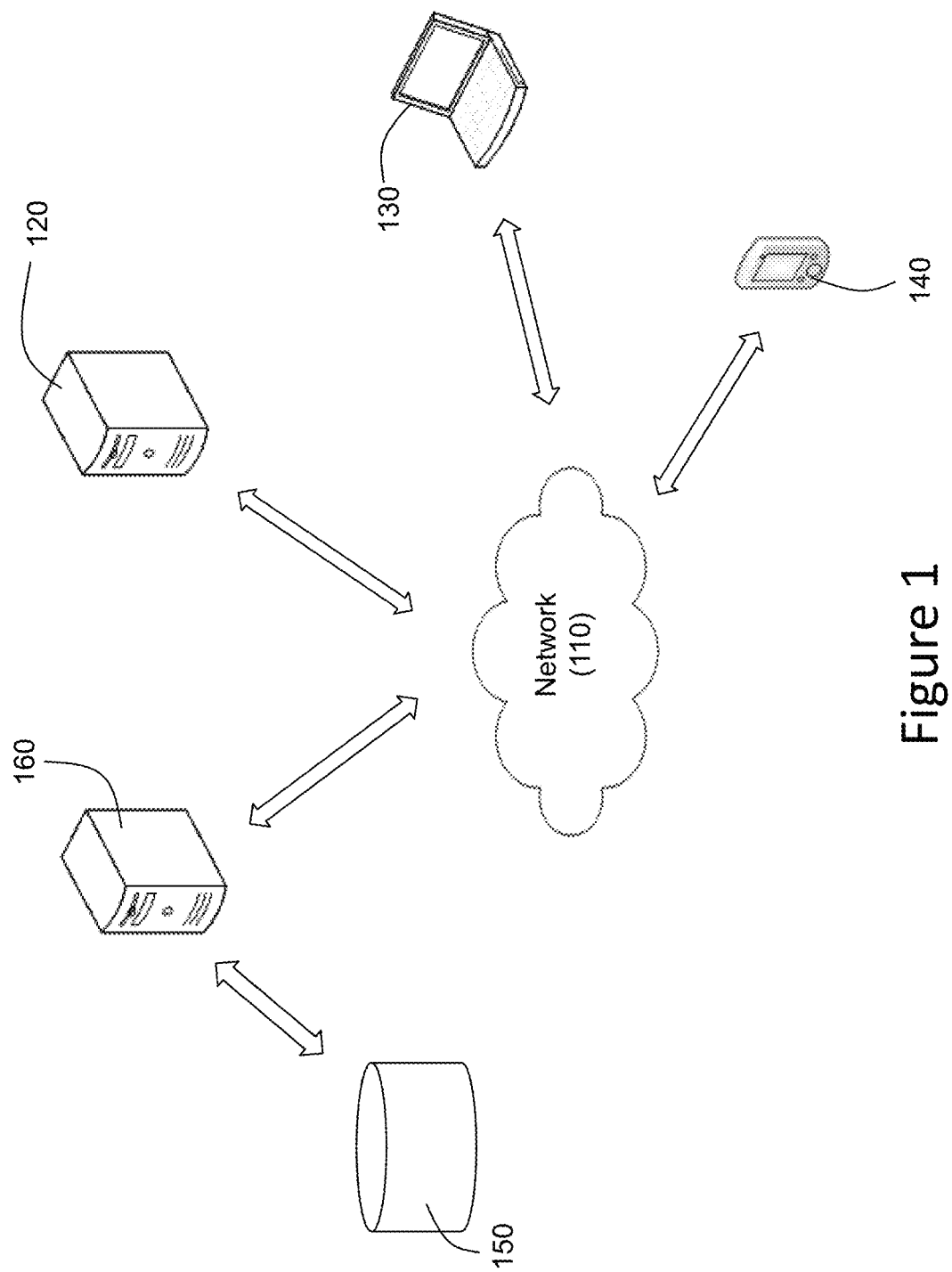
FIG. 1 is a diagram of a system for providing a pre-built user interface for payment flow integration according to an exemplary embodiment of the invention.

An exemplary payment flow integration system and method having a pre-built user interface are described herein. With reference to FIG. 1, the system may include a network 110 that connects the various computing devices shown in FIG. 1. The network 110 may comprise, for example, any one or more of the Internet, an intranet, a Local Area Network (LAN), a Wide Area Network (WAN), a payment network, an Ethernet connection, a WiFi network, a Global System for Mobile Communication (GSM) link, a cellular phone network, a Global Positioning System (GPS) link, a satellite communications network, or other network, for example. An online platform may provide services that require transactions to be executed between users (e.g., donors, customers, players, or other payors) and organizations (e.g., charities, event planners, amateur teams, merchants, etc.), and the platform may include a website, mobile app, application programming interface (API), or other interfaces for allowing interactions between the organization and its users. The online platform may be referred to herein as a "partner" of a payment service provider (e.g., WePay) that, as described herein, facilities the online transactions for the entities using the platform. Examples of partners may include, but are not limited, entities such as GoFundMe, TeamSnap, WebConnex, EventZilla, and Classy. According to one embodiment, a partner may provide an API or other interface to its users to enable processing online transactions for and/or between its users with the payment flow integration system and method described herein.

The partner's platform, website or app may be maintained on the partner's server 120, which may comprise, for example, a computer server, software, and database for communicating, processing and storing various data, including, transaction information. Through a client device, such as laptop computer 130, mobile phone 140, or other personal computing device (e.g., tablet computer or desktop computer), a user may interact with the partner via a web browser UI, or mobile app UI, executed on the client device 130 or 140. A payment service provider may comprise one or more entities that facilitate online financial transactions for partners and their users, using the partner's platform. The payment service provider may provide a payment service that includes safeguarding sensitive financial information and communicating sensitive payment information over credit and debit card networks to a bank database 150, for example, to validate and authorize payment information, and to settle any charges that are made between any of the entities using the partner's platform (e.g., a payment from a donor to a charitable organization operating a platform). The payment service provider may own and operate a server 160 for tokenizing users' sensitive financial information, for creating inline frames (iFrames) and onetime use tokens (both used to facilitate a secure UI on the payment pages on a partner's website or app) and for other functions and applications specific to the pre-built UI payment flow integration system and method described herein, as will be described further below.

Figure 2:
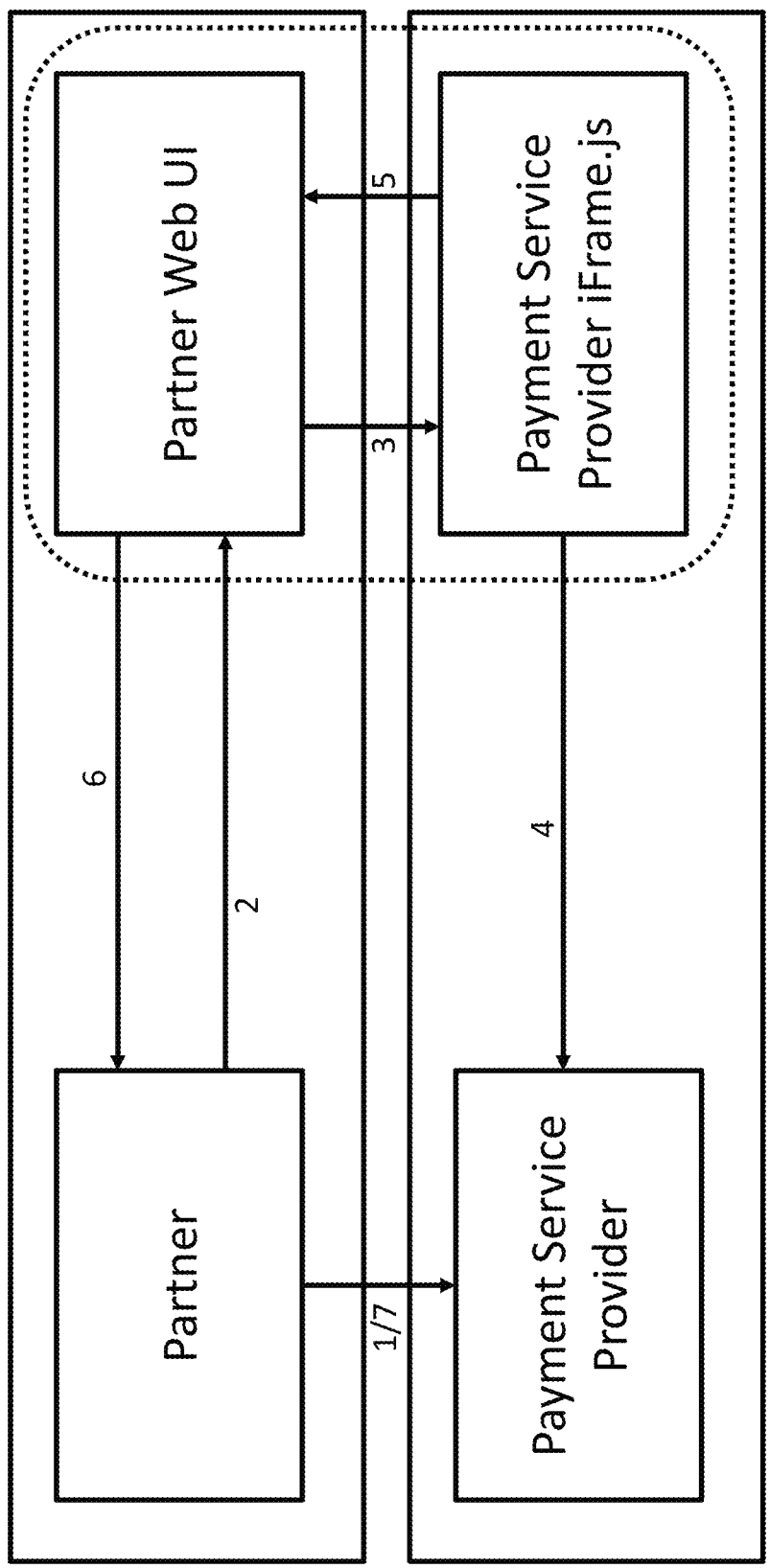
FIG. 2 is a diagram illustrating an example of a method for implementing a pre-built user interface for payment flow integration according to an exemplary embodiment of the invention.

FIG. 2 is a flow diagram illustrating an exemplary method for implementing a payment flow integration system having a pre-built user interface according to an exemplary embodiment of the invention. In step 1, a partner, such as a charitable organization, recreational sports team, or event planner, when initiating a payment process, makes a server-to-server call to a payment service provider to generate an iFrame. An iFrame (inline frame) may comprise an HTML element that allows an external webpage to be embedded in an HTML document (e.g., a web page). The partner can specify the desired look and feel of its payment page using Custom Cascading Sheets (CSS) language, with such design information being stored in a CSS file, and can reference the CSS file in a URL in a server-to-server call to the payment service provider's server. The partner may specify the desired look and feel of the payment page, based on the preferences of the entities using the partner's platform.

CSS is a markup language that controls the appearance of HTML elements on a webpage. The custom CSS URL will specify how the partner wants its payment page UI to look and feel when viewed by the users (e.g. customers) viewing the payment page. For example, the partner can specify, using CSS, the font style and size, the color scheme, the layout of the payment buttons, informational fields, and text boxes, and other aspects of the displayable features on a partner's checkout page. The custom CSS call can enable the partner to have complete customization of the user interface that will be presented on the payment page via the iFrame URL that is returned to the partner. The custom CSS can be rendered by the payment service provider when generating an iFrame.

An API may be used for the server-to-server call between the partner and payment service provider, with the application residing on the payment service provider's server. Via the API, the partner can transmit the CSS URL to the application residing on the payment service provider's server. As will be described further below with respect to FIG. 3A, the partner may also use an API of the payment service provider to upload a CSS file that defines the look and feel of the partner's desired payment interface. In this embodiment, the API is used to upload the CSS file, and the payment service provider passes back a CSS identification code (CSS ID) that the partner can use subsequently to specify the applicable CSS that should be passed with the iFrame URL. In this way, partners do not have to specify "Custom CSS URL" every time they generate iFrame URLs. Doing this will allow partners to apply multiple themes on the iFrames.

As described more fully below, in one embodiment the partner embeds an iFrame generated by the payment service provider into the partner's webpage. To users, the payment page, which is rendered by the payment service provider and embedded into the partner's website via the iFrame, appears seamlessly integrated into the partner's website. However, unlike the rest of the partner's website, the iFrame is hosted on the payment service provider server 160. In this manner, any sensitive payment information input by a user in the iFrame (whether the iFrame is placed in the partner's website or mobile app) is never stored on the partner's server 120.

Further, in step 1, the payment service provider downloads the CSS URL from the partner's server after the partner makes the CSS URL server-to-server call as described above. The payment service provider then embeds the CSS URL in an iFrame, and returns the iFrame URL to the partner. In order to implement the iFrame described in this embodiment, the partner (or its developer) merely has to embed the received iFrame URL into the partner's webpage, without any complex Javascript, or HTML coding. In addition, the iFrame URL generated by the payment service provider and transmitted to the partner includes a onetime use token. The onetime use token, as described further below with respect to step 3, is used to enable the payment service provider to authenticate and validate the transaction request by the user. The onetime use token is kept valid for a limited time, and thus advantageously increases the security of the system as compared to existing systems. The onetime use token, because it is generated by the payment provider and transmitted to the partner's website, may advantageously be associated with a particular checkout or payment request of a particular iFrame, which reduces the chance of abuse by preventing reply attacks and facilitates simpler audit trail processes for both the partner and the payment service provider. In addition, because validating a onetime use token utilizes a form of symmetric cryptosystem, it is more efficient and quicker for the payment service provider's system to initiate the authentication of payment information compared to existing systems. The onetime use token merely needs to be presented to the payment service provider's server in order for the server to identify the origin, and thus verify the request for tokenization initialization. In contrast, existing systems which implement a public key and a private key require both encrypting and decrypting requests when initiating tokenization of sensitive user information.

In step 2 in FIG. 2, the partner embeds the iFrame URL in their web UI (e.g., checkout webpage) along with reference to an iFrame.js program provided by the payment service provider. As shown in FIG. 2, the iFrame.js program resides on the payment service provider's server 160. Embedding the reference to the iFrame.js program enables the partner's web UI to reference an application on the payment service provider's server 160, so that sensitive customer payment information may be transmitted directly to the payment service provider's server once the customer submits the payment form on the web UI. No custom CSS need be embedded within iFrame.js after it is transmitted to the partner, because the custom CSS has already been incorporated into the iFrame URL transmitted by the payment service provider to the partner. This feature enables a partner's website developers to have complete customization of the payment form, without undue programming effort.

At step 3 in FIG. 2, after a user completes a transaction and submits the payment form including the customer's sensitive information at the partner's web UI, the iFrame.js module captures the sensitive payment information from the user's submission as well as the onetime use token. By virtue of the iFrame, the payment information is transmitted from the partner's web UI via iFrame.js without ever being stored on the partner's server 120. The onetime use token identifies, to the payment service provider, which web browser or native app the payment information has originated from, enabling the payment service provider's server 160 to efficiently authenticate and validate the token initialization request. Further, as the onetime use token expires in a short period after its first use, there is little concern that the request originated from an unauthorized user. Such use of a onetime use token mitigates the risk of replay attacks.

At step 4 in FIG. 2, iFrame.js submits the user's payment information to the payment service provider's server 160 to tokenize the payment information (e.g., generate a payment token), and iFrame.js receives the payment token in response. The tokenization of the payment information adds an extra layer of security to sensitive financial data by replacing the sensitive data with an algorithmically generated code (the token). Usually in tokenization of credit card information, for example, the user's primary account number (PAN) is replaced with a series of randomly generated numbers and letters represented as a string. This enables other entities, such as the partner, to handle an object representing the financial transaction (e.g., the payment token) without being exposed to any sensitive financial information that would implicate compliance obligations. In this embodiment, only the payment service provider and any other entities (e.g. the bank issuing the credit card) necessary for validating or authorizing the sensitive payment information are given access to a key for decrypting the payment token.

At step 5 in FIG. 2, iFrame.js passes the payment token to the partner UI's parent window. In other words, iFrame.js passes the payment token to the webpage user interface maintained on the partner's server which contains the embedded payment service provider's iFrame.

At step 6, the payment token is submitted to the partner's server 120 from the parent window, as well as the rest of the form data as part of form submission.

At step 7, the partner makes a server-to-server call, via the payment service provider's API for checkout or payment using the payment token generated in step 4. Once the payment service provider receives the payment token from the partner's server via the API call, it can process that payment from the tokenized information. For example, when the client submits their payment information, which is sent directly to the payment service provider's server, the payment service provider securely stores that information and returns a payment token which is used as a pointer to that stored data. When the server-to-server call comes in to the payment service provider, the payment service provider decrypts that information and sends it to the issuing bank through the card networks.

Afterwards, the payment service provider settles the charge with, for example, the issuing bank through the card networks. This allows the partner to avoid handling any of its customers' sensitive financial information and complying with PCI standards, for example.

Figure 3A:
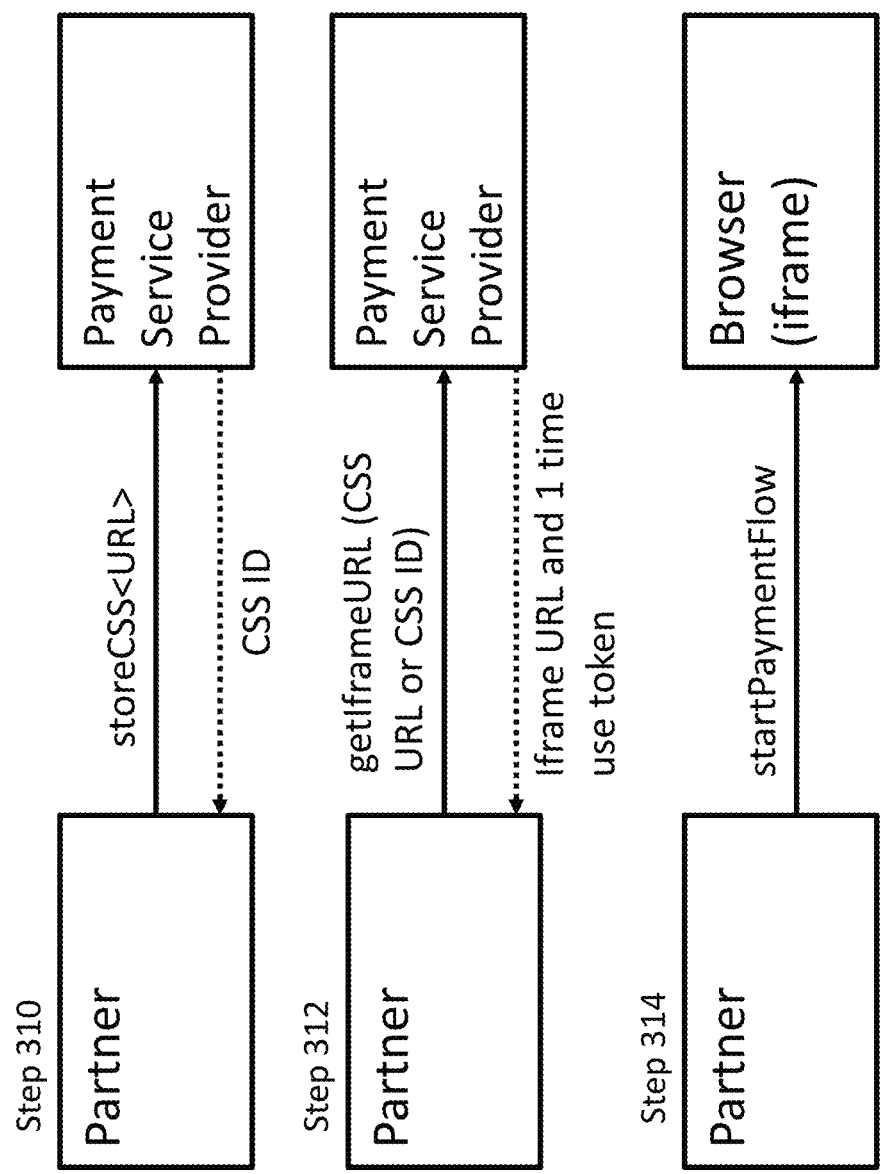
FIGS. 3A and 3B illustrate another example of a method for implementing a pre-built user interface for payment flow integration according to an exemplary embodiment of the invention.
Figure 3B:
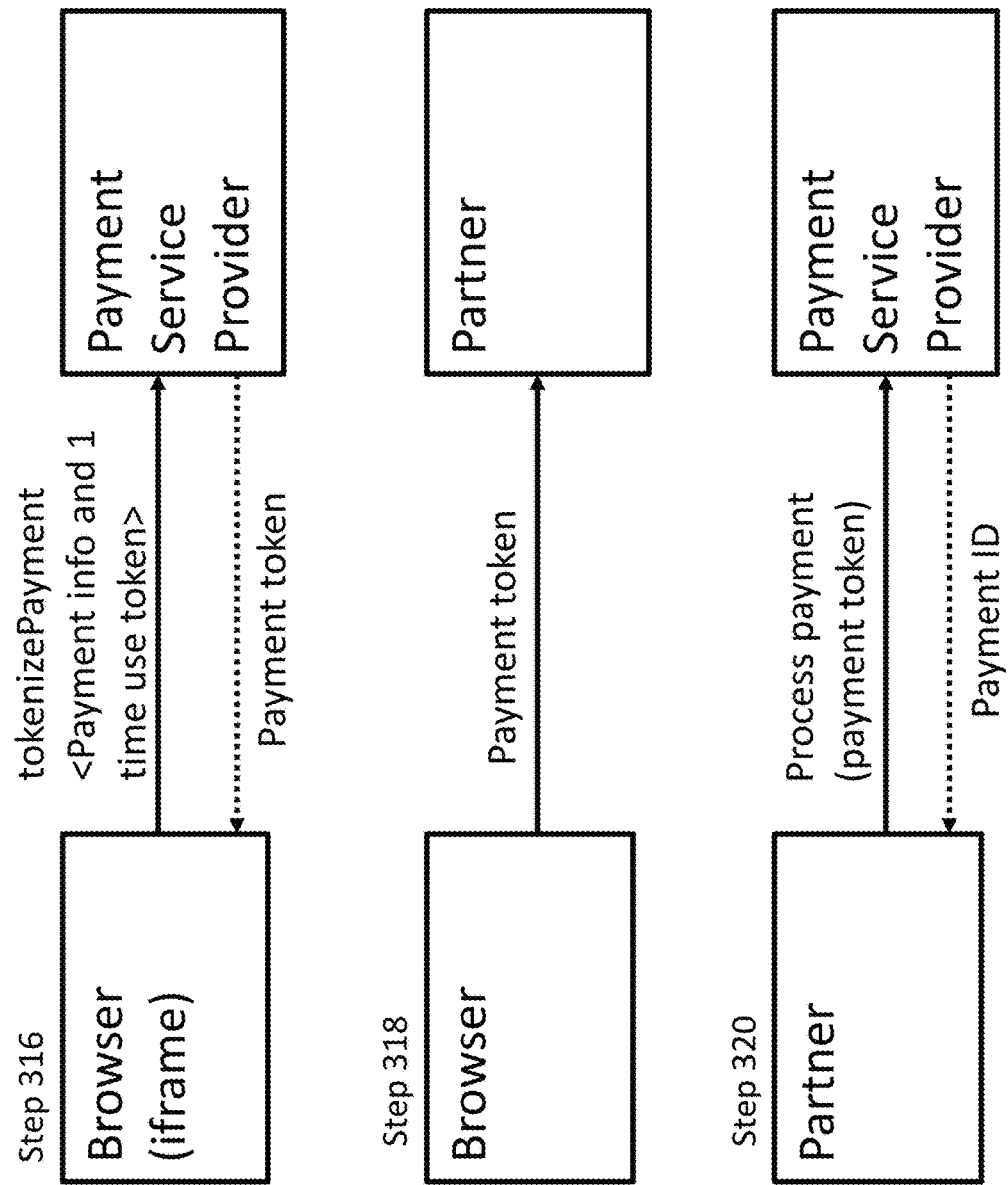

According to another embodiment, as shown in FIGS. 3A and 3B, a partner can upload a custom CSS file using an API or user interface outside the payment flow, and reuse the same CSS file for subsequent calls. The embodiment described in FIGS. 3A and 3B is similar to that described in connection with FIG. 2, except in step 310 in FIG. 3A, prior to initiating the payment flow, a partner using the partner's user interface or API calls a payment service provider's API to store custom CSS data on the payment service provider's systems. For example, in step 310 the partner makes the call "storeCSS<URL>". In response, the payment service provider returns a CSS ID. The CSS ID can be used in subsequent calls by the partner, so that rather than using an entire URL string in a call specifying the custom CSS, a call merely specifying the CSS ID will return the custom CSS which was specified in the initial CSS URL call. The partner's server 120 stores the CSS URL for the purpose of recalling the CSS in any subsequent CSS ID calls.

In step 312, as part of initiating the payment flow, the partner may call the payment service provider's server using "getframeURL." In this step, the partner has the option of specifying a CSS ID, or specifying a custom CSS URL as described more fully above in connection with FIG. 2, in the server-to-server call to the payment service provider's server. In response, the payment service provider returns an iFrame URL, generated with the specified custom CSS code, and a onetime use token.

In step 314 the partner embeds the iFrame URL, received in step 312 into its webpage, or native app, UI in order to start the payment flow.

In step 316, shown in FIG. 3B, once the user enters the payment information on the iFrame (which is hosted by the payment service provider's servers) and submits the payment form hosted in the iFrame, the user's sensitive payment information is sent to the payment service provider's servers along with the onetime use token. The advantages of this step are described above with respect to FIG. 2.

In step 318, if the onetime use token transmitted in step 316 is validated as described above in step 3 of FIG. 2, the payment token generated by the payment service provider's server is returned to the browser (or native app) of the UI in which is embedded the iFrame in step 314. The browser then submits the payment token to the partner's server.

In step 320, the partner makes a server-to-server call, and sends the payment token, as part of the payment processing API to the payment service provider's server.

Those skilled in the art will appreciate that the system and flow diagrams discussed above are merely examples of a user interface payment flow configuration and are not intended to be limiting. Other types and configurations of networks, servers, databases and client devices (e.g., desktop computers, tablet computers, mobile computing devices, smart phones, etc.) may be used with exemplary embodiments of the invention. Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

In the system and method of exemplary embodiments of the invention, a variety of "user interfaces" may be utilized to allow a user such as a customer to interface with the client device. As used herein, a user interface may include any hardware, software, or combination of hardware and software used by a processor that allows a user to interact with the processor of the client device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although examples of servers and personal computing devices are shown in the figures, exemplary embodiments of the invention may utilize other types of communication devices whereby a user may interact with a network that transmits and delivers data and information used by the various systems and methods described herein. The personal computing devices may include desktop computers, laptop computers, tablet computers, smart phones, and other mobile computing devices, for example. The servers and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

The servers and personal computing devices described above and shown in the figures may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Any suitable programming language may be used in accordance with the various embodiments of the invention. For example, the programming language used may include assembly language, Ada, APL, Basic, C, C++, dBase, Forth, HTML, Android, iOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer implemented method for executing an online payment transaction, the method comprising:
    receiving, at a payment service provider (PSP) server, an application programming interface (API) call from a partner server, wherein the API call specifies customized cascading style sheets (CSS) data for the partner;
    embedding, by the PSP server, the customized CSS data into an inline frame (iFrame);
    transmitting, by the PSP server to the partner server, an iFrame universal resource locator (URL) and a onetime use token, wherein the iFrame URL is designed to be embedded by the partner into a partner webpage, and the customized CSS data is used to customize a look and feel of a payment window within the partner webpage;
    receiving, at the PSP server, payment information of a user and the onetime use token, wherein the user payment information is transmitted directly to the PSP server via an iFrame.js program and the user payment information is not stored on the partner server;
    validating, at the PSP server, the onetime use token;
    generating, at the PSP server, a payment token associated with the user payment information;
    transmitting, by the PSP server, the payment token to the partner;
    receiving, at the PSP server from the partner server, an API call for a payment transaction that includes the payment token;
    at the PSP server, using the payment token to execute the payment transaction by the user to the partner via a payment card network;
    receiving, at the PSP server from the partner server via an API of the PSP, a CSS file in which the customized CSS data is stored;
    generating a CSS identification code (CSS ID) at the PSP server;
    transmitting the CSS ID to the partner server; and
    at the PSP server, using the CSS ID to identify the customized CSS data to be used with the iFrame.

2. The computer implemented method of claim 1, wherein the customized CSS data defines a font style, a font size, a color scheme, an informational field, a text box, and a layout which define the look and feel of the payment window.

3. The computer implemented method of claim 2, wherein the customized CSS data allows the partner to design a payment page rendered by the PSP and embedded into the partner webpage via the iFrame to have a same look and feel as the partner webpage.

4. The computer implemented method of claim 1, wherein the customized CSS data is stored in a CSS file, and the CSS file is referenced via a custom CSS URL.

5. The computer implemented method of claim 1, further comprising maintaining the onetime use token as valid for a limited time period.

6. The computer implemented method of claim 5, further comprising determining, at the PSP server, whether the onetime use token is valid upon receiving the onetime use token from the partner server via the API call.

7. The computer implemented method of claim 1, wherein the onetime use token is validated with a symmetric cryptosystem.

8. The computer implemented method of claim 1, wherein the step of transmitting, the payment token to the partner comprises transmitting the payment token to a user interface (UI) of a parent window maintained on the partner server.

9. A computer implemented system for executing an online payment transaction, the system comprising:
    an electronic memory; and
    a payment service provider (PSP) server that is programmed to:
    receiving an application programming interface (API) call from a partner server, wherein the API call specifies customized cascading style sheets (CSS) data for the partner;
    embed the customized CSS data into an inline frame (iFrame);
    transmit to the partner server an iFrame universal resource locator (URL) and a onetime use token, wherein the iFrame URL is designed to be embedded by the partner into a partner webpage, and the customized CSS data is used to customize a look and feel of a payment window within the partner webpage;
    receive payment information of a user and the onetime use token, wherein the user payment information is transmitted directly to the PSP server via an iFrame.js program and the user payment information is not stored on the partner server;
    validate the onetime use token;
    generate a payment token associated with the user payment information;
    transmit the payment token to the partner;
    receive from the partner server an API call for a payment transaction that includes the payment token;
    use the payment token to execute the payment transaction by the user to the partner via a payment card network;
    receive from the partner server via an API of the PSP, a CSS file in which the customized CSS data is stored;
    generate a CSS identification code (CSS ID);
    transmit the CSS ID to the partner server; and
    use the CSS ID to identify the customized CSS data to be used with the iFrame.

10. The computer implemented system of claim 9, wherein the customized CSS data defines a font style, a font size, a color scheme, an informational field, a text box, and a layout which define the look and feel of the payment window.

11. The computer implemented system of claim 10, wherein the customized CSS data allows the partner to design a payment page rendered by the PSP and embedded into the partner webpage via the iFrame to have a same look and feel as the partner webpage.

12. The computer implemented system of claim 9, wherein the customized CSS data is stored in a CSS file, and the CSS file is referenced via a custom CSS URL.

13. The computer implemented system of claim 9, wherein the PSP server is further designed to maintain the onetime use token as valid for a limited time period.

14. The computer implemented system of claim 13, wherein the PSP server is further programmed to determine whether the onetime use token is valid upon receiving the onetime use token from the partner server via the API call.

15. The computer implemented system of claim 9, wherein the onetime use token is validated with a symmetric cryptosystem.

16. The computer implemented system of claim 9, wherein the PSP server is programmed to transmit the payment token to a user interface (UI) of a parent window maintained on the partner server.

\* \* \* \* \*